US010938256B2

United States Patent
Katsuragi et al.

(10) Patent No.: US 10,938,256 B2
(45) Date of Patent: Mar. 2, 2021

(54) MOTOR STATOR AND MANUFACTURING METHOD THEREOF

(71) Applicant: Mitsubishi Electric Corporation, Tokyo (JP)

(72) Inventors: Kota Katsuragi, Tokyo (JP); Shoichiro Nishitani, Tokyo (JP); Shinichiro Yoshida, Tokyo (JP); Ryuji Kitamura, Tokyo (JP); Fumitaka Totsuka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 176 days.

(21) Appl. No.: 16/159,964

(22) Filed: Oct. 15, 2018

(65) Prior Publication Data
US 2019/0348873 A1 Nov. 14, 2019

(30) Foreign Application Priority Data

May 9, 2018 (JP) ................................ 2018-090315

(51) Int. Cl.
*H02K 1/16* (2006.01)
*H02K 1/18* (2006.01)
(Continued)

(52) U.S. Cl.
CPC ............. *H02K 1/165* (2013.01); *H02K 1/18* (2013.01); *H02K 3/28* (2013.01); *H02K 3/38* (2013.01);
(Continued)

(58) Field of Classification Search
CPC ...... H02K 3/38; H02K 1/165; H02K 15/0068; H02K 2203/00; H02K 1/18; H02K 3/28
(Continued)

(56) References Cited

U.S. PATENT DOCUMENTS

| 7,650,682 B2 * | 1/2010 | Sugishima | H02K 1/148 |
| | | | 242/361.1 |
| 7,763,998 B2 * | 7/2010 | Makino | H02K 3/522 |
| | | | 310/71 |

(Continued)

FOREIGN PATENT DOCUMENTS

| JP | 9-37494 A | 2/1997 |
| JP | 2010-74889 A | 4/2010 |

(Continued)

OTHER PUBLICATIONS

Communication dated May 28, 2019 from Japanese Patent Office in counterpart JP Application No. 2018-090315.

(Continued)

*Primary Examiner* — Forrest M Phillps
(74) *Attorney, Agent, or Firm* — Sughrue Mion, PLLC; Richard C. Turner

(57) ABSTRACT

In a motor stator, terminal wires of a coil are led out respectively from a feed-side and a neutral-side coil end. With three circumferentially adjacent first-, second-, and third-phase coils as one set, the leading end portion and intermediate portion of one of three terminal wires led out from the neutral side are connected to each of the remaining terminal wires. A structure wherein the first- and second-phase terminal wires are connected together in one position, and the second- and third-phase terminal wires are connected together in a different position from the one position, is adopted, thus compacting the size of one wire connection portion.

12 Claims, 10 Drawing Sheets

(51) Int. Cl.
*H02K 3/38* (2006.01)
*H02K 15/00* (2006.01)
*H02K 3/28* (2006.01)

(52) U.S. Cl.
CPC ..... *H02K 15/0068* (2013.01); *H02K 2203/00* (2013.01)

(58) Field of Classification Search
USPC .......................................................... 310/179
See application file for complete search history.

(56) References Cited

U.S. PATENT DOCUMENTS

| | | | |
|---|---|---|---|
| 2009/0256438 A1* | 10/2009 | Ikeda | ..................... H02K 3/522 310/71 |
| 2009/0309452 A1 | 12/2009 | Tao et al. | |
| 2012/0005881 A1 | 1/2012 | Tao et al. | |
| 2017/0149299 A1 | 5/2017 | Sakamoto et al. | |

FOREIGN PATENT DOCUMENTS

| JP | 2011-250513 A | 12/2011 |
|---|---|---|
| JP | 2012-170166 A | 9/2012 |
| JP | 2016-28542 A | 2/2016 |
| JP | 5965207 B2 | 8/2016 |

OTHER PUBLICATIONS

The State Intellectual Property Office of the P.R. of China Communication dated Oct. 9, 2020, issued in Application No. 201910343760.5.

* cited by examiner

MOTOR STATOR AND MANUFACTURING METHOD THEREOF

BACKGROUND OF THE INVENTION

Field of the Invention

The present application relates to a motor stator which is applied to, for example, a vehicle's electric motor mounted on an automobile, and a manufacturing method thereof.

Description of the Related Art

In recent years, the technological development of a concentrated winding motor is being advanced with the primary aim of downsizing and higher power. A plurality of split cores are annularly disposed in a stator of this kind of motor, and each split core includes a tooth and core back wherein magnetic steel sheets are laminated one on another, insulating members attached to the tooth, such as an insulator and an insulation sheet, and a coil into which a wiring is wound on the insulating members. Then, the tooth and the coil are insulated from each other by the insulating members.

A current corresponding to one of three phases (U, V, and W) is flowing through the coil wound around the split core. Then, three terminal wires of the coils led out one from each of three split cores corresponding to the three phases adjacent to each other are bound together into one bundle in the same portion on the circular ring on the radially outer side of the motor, and this wire connection portion is housed in a housing groove provided in the insulator, forming a neutral point at which the terminal wires of adjacent coils are connected together (for example, refer to PTL 1).

[PTL 1] Japanese Patent No. 5,965,207

In the case of this kind of heretofore known motor, forming is carried out in the procedure wherein the three three-phase terminal wires are bundled and connected together on the radially outer side as the neutral point and thereafter are bent inward. Therefore, a configuration is such that the wire connection portion acting as the neutral point bulges radially outward by the amount equivalent to the radius of the wire connection portion wherein the amount equivalent to springback occurring when bending the bundled three terminal wires is taken into account. Because of this, there is a problem in that the wire connection portion protrudes radially outward, the insulator which houses the wire connection portion protrudes radially outwardly of the core, and the amount of protrusion of the insulator becomes larger than that of the core back on the radially outer side of the split core, thus leading to an increase in the dimension of a product.

SUMMARY OF THE INVENTION

The present application has been made to solve the heretofore mentioned kind of problem, and an object of the present application is to provide a motor stator, wherein a wire connection portion acting as a neutral point does not protrude radially outwardly of a core and bending forming of a terminal wire is not needed after wire connection, and a method of manufacturing the motor stator.

The motor stator disclosed in the present application includes a plurality of teeth disposed along a direction of a circumference centered on the axis of a motor; coils which are wound one around each of the teeth and to each of which to feed a current of one of a first, a second, or a third phase; and insulators, each of which insulates the tooth from the coil and holds the coil. In the motor stator, a first, a second, and a third coil corresponding to the first, second, and third phases, disposed along the circumferential direction, respectively, have a first, a second, and a third terminal wire on a neutral side which are led out from respective winding portions wound one around each of the teeth. Also, the first and second terminal wires are connected together in a first wire connection portion, and the second and third terminal wires are connected together in a second wire connection portion spaced from the first wire connection portion.

A motor stator manufacturing method disclosed in the present application, which manufactures the heretofore mentioned kind of motor stator, is such that the first and second terminal wires or the second and third terminal wires are connected together by brazing in the first or second wire connection.

Also, in a motor stator manufacturing method disclosed in the present application, the first and second terminal wires centered on the first wire connection portion or the second and third terminal wires centered on the second wire connection portion are press fitted in the bottom portion of a groove portion provided in the insulator.

According to the motor stator disclosed in the present application, it is not that the three-phase terminal wires are connected together in one wire connection portion, but that the first and second terminal wires are connected together in the first wire connection portion, and furthermore, that the second and third terminal wires are connected together in the second wire connection portion spaced from the first wire connection portion, so that the number of terminal wires connected together in one wire connection portion is two, and the one wire connection portion can be configured to be more compact than a heretofore known one, thus enabling the product to be radially downsized.

According to the motor stator manufacturing method disclosed in the present application, the first or second wire connection portion can be formed by brazing and thereby connecting the conductive wire portions of the first and second terminal wires or the conductive wire portions of the second and third terminal wires.

Also, according to the motor stator manufacturing method disclosed in the present application, it is possible to press fit and hold the first or second wire connection portion in the bottom portion of the groove portion of the insulator.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

First Embodiment

A description will be given, using FIGS. 1 to 6, of a motor stator according to a first embodiment of the present application. A motor stator 10 of the present application is applied to, for example, a vehicle's electric motor mounted on an automobile, and particularly is used as a concentrated winding stator of a split core structure.

Figure 1:
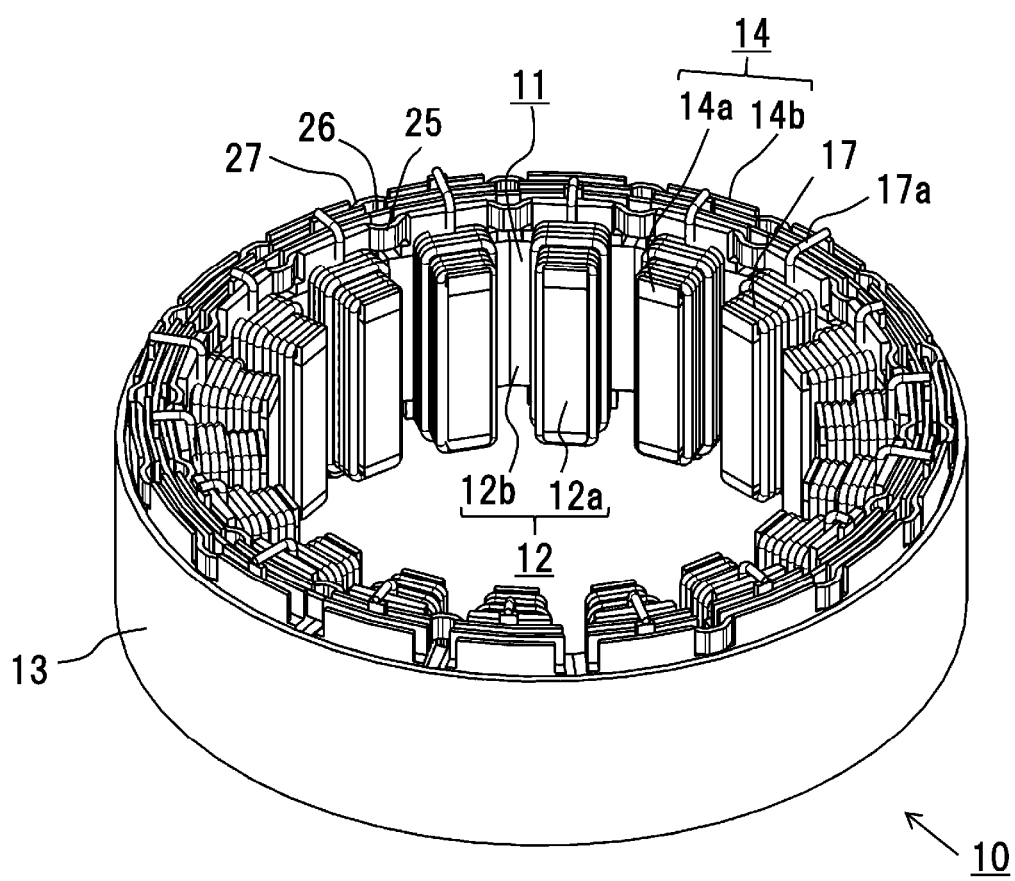
FIG. 1 is a perspective view of a motor stator according to a first embodiment.

FIG. 1 is a perspective view of the motor stator 10 according to the first embodiment of the present application, equivalent to a diagram of the motor stator 10 as seen from a feed side.

Figure 2:
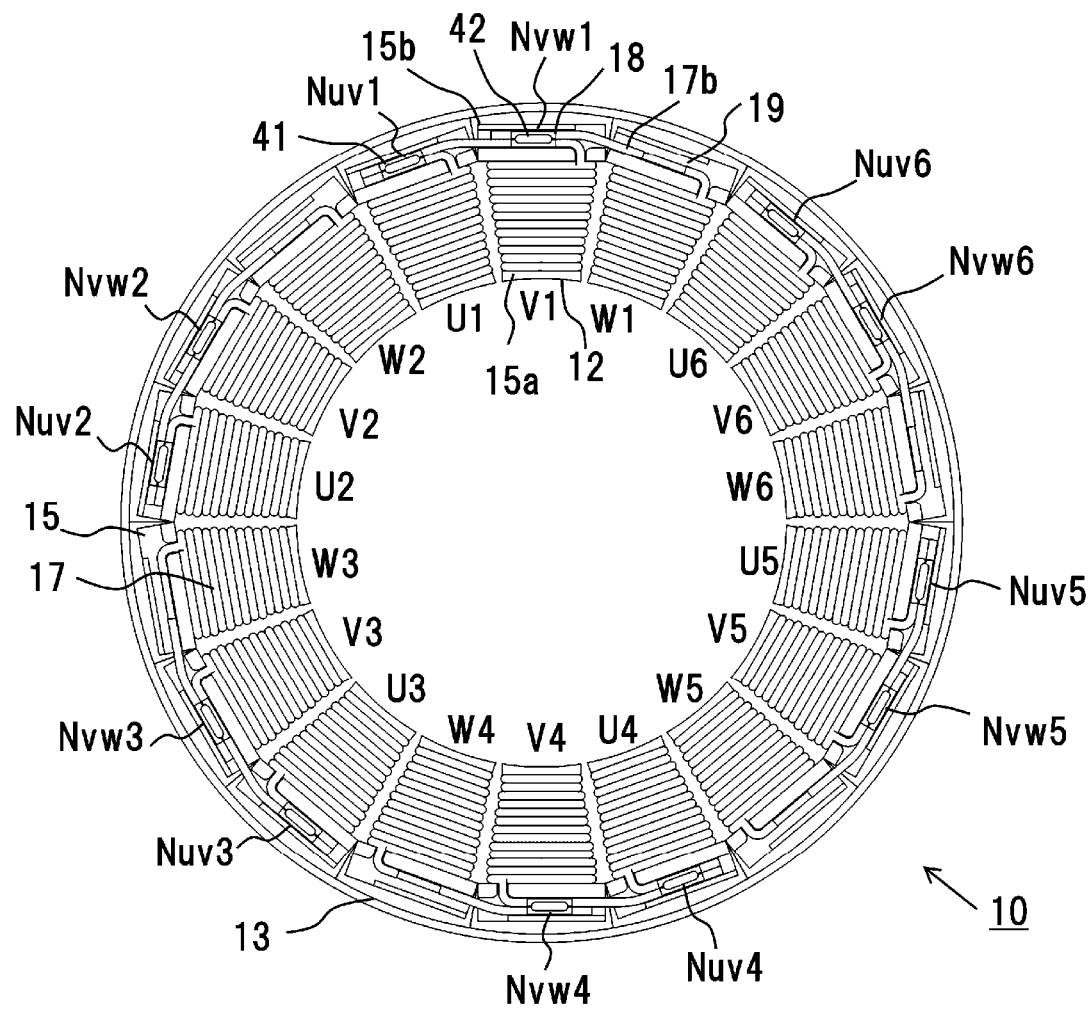
FIG. 2 is a front view of the neutral side of the stator of FIG. 1.

Also, FIG. 2 is a front view of the stator 10 as observed from a neutral side. As shown in FIGS. 1 and 2, the stator 10 is of a wiring structure with one axial end face as the feed side and the other axial end face as the neutral side. The axial direction is the same as an axial direction of a motor and the stator 10.

The stator 10 is of a configuration with a stator core 11, wherein 18 split cores 12 are circularly arranged, as the base. Then, the split cores 12 are housed in a yoke 13, disposed at regular intervals so as to be coradially positioned concentrically with the axis of the motor in a plane perpendicular to the axis.

A current equivalent to one of three phases (a U phase (a first phase), a V phase (a second phase), or a W phase (a third phase)) flows through a coil 17 wound around each of the split cores 12, and as shown in FIG. 2, a first split core portion (a set of split cores 12 shown by signs U1, V1, and W1) to a sixth split core portion (a set of split cores 12 shown by signs U6, V6, and W6) are circumferentially disposed in that order.

The coil 17 to be fed with the U-phase current is equivalent to a first coil, and in the same way, the coils 17 to be fed with the V- and W-phase currents are equivalent to a second and a third coil, respectively.

It goes without saying that it is also possible, in reverse, to set the first, second, and third coils to be of the W, V, and U phases, respectively.

As heretofore described, the split cores 12, wherein the annular stator core 11 is circumferentially equally divided into 18 pieces, each have a configuration such that a predetermined number of magnetic steel sheets are laminated into a single unit.

Then, the split cores 12 each include an arc-like core back portion 12b (a core back), a section of which perpendicular to the axis has a radial width, and a tooth 12a which protrudes radially inward from the inner peripheral wall surface of the core back portion 12b.

As shown in FIG. 1, the split core 12 includes a coil 17 of one of the three phases, that is, one of the U, V, or W phase, which is wound around the tooth 12a via insulating members (an insulator 14, an unshown insulation sheet, and the like), and a bus ring 25, 26, or 27 (a bus bar) to which to connect a terminal wire 17a led out to the feed side from the coil 17 to be fed with a U-, V-, or W-phase current. The bus rings 25, 26, and 27 are configured of three conductive bodies corresponding to the U, V, and W phases, respectively, and the coil 17 and the terminal wire 17a thereof are connected to the bus ring 25, 26, or 27 of their corresponding phase.

The feed-side insulator 14, fabricated of a resin material such as polybutylene terephthalate (PBT) or poly phenylene sulfide resin (PPS), includes a coil winding portion 14a and a flange portion 14b provided on the radially outer side of the coil winding portion 14a.

The feed-side insulator 14 is disposed in one axial end face portion of the stator 10, and a neutral-side insulator 15 is disposed in the other axial end face portion of the stator 10. The insulators 14 and 15 can be provided integrally by being connected together in an unshown portion.

At this time, the coil winding portion 14a is disposed on one axial end face of the tooth 12a, and the flange portion 14b is disposed on one axial end face of the core back portion 12b. Groove-like bus ring holding portions in each of which to house one of the bus rings 25, 26, and 27 corresponding to the U, V, and W phases are concentrically formed one in each flange portion 14b.

Also, the neutral-side insulator 15 shown in FIG. 2, which is disposed axially symmetrical to the feed-side insulator 14 with respect to the split core 12, includes a coil winding portion 15a around which to wind the coil 17 and, on the radially outer side of the coil winding portion 15a, a flange portion 15b in which is provided a groove portion 19 in which to house another terminal wire 17b led out from the coil 17.

The neutral-side insulator 15 is fabricated of a resin material, such as PBT or PPS, in the same way as the feed-side insulator 14.

The insulators 14 and 15 may be configured so as to be fixed to the split core 12 in terms of the ease of winding the coil 17. For example, the insulators 14 and 15 can be fixed to the split core 12 by being fitted therein, and a configuration may be such that the insulators 14 and 15 are fixed to the split core 12 with an adhesive or the like. Also, the insulators 14 and 15 may be mold formed integrally with the split core 12.

The coil 17 is configured by winding a conductor wire (a conductive wire portion) made of an insulation-coated round copper wire, a predetermined number of turns, around the tooth 12a and around the coil winding portions 14a and 15a of the insulators 14 and 15 disposed one on each axial end face of the tooth 12a.

The insulators 14 and 15 are also disposed on each circumferential side portion of the tooth 12a (not shown), thus ensuring the insulation between the coil 17 and the split core 12.

The 18 split cores 12 around each of which the coil 17 is wound are inserted and fixed in the cylindrical yoke 13, by press fitting, shrink fitting, or the like, with the teeth 12a directed radially inward and arranged annularly with the circumferential sides of adjacent core back portions 12b abutting against each other.

The yoke 13 is fabricated by cutting or drawing a single metal material, such as iron, but may be fabricated by laminating steel sheets, such as magnetic steel sheets, into a single unit.

The coils 17, each wound around the split core 12, which are arranged circularly are arranged with the order of the U, V, and W phases repeated circumferentially. One terminal wire 17a of each coil 17 is led out to the feed-side insulator 14 side. Also, the other terminal wire 17b of each coil 17 is led out to the neutral-side insulator 15 side.

The bus rings 25, 26, and 27 which form U-, V-, and W-phase voltage supply terminals are each configured by bending and forming a belt-like flat plate of oxygen-free copper, deoxidized copper, tough pitch copper, or the like, into a partially opened cylindrical form. The U-, V-, and W-phase bus rings 25, 26, and 27 are fitted, fixed with a fixing material, such as an adhesive, as needed, and held in the respective bus ring holding portions disposed on the radially inner side of the yoke 13.

As shown in FIG. 1, the feed-side terminal wire 17*a* of the U-phase coil 17 is led out from the coil winding portion 14*a* in the axial direction of the insulator 14, bent at a right angle, led out radially outward, and electrically connected to the coil connection portion of the U-phase bus ring 25.

In the same way, the terminal wire 17*a* of each V-phase coil 17 is led out axially to the insulator 14 side, bent at a right angle, led out radially outward, and connected to the coil connection portion of the V-phase bus ring 26. The terminal wire 17*a* of the W-phase coil 17 is led out axially to the insulator 14 side, bent at a right angle, led out radially outward, and connected to the coil connection portion of the W-phase bus ring 27.

Herein, the three terminal wires 17*a* of the U-, V-, and W-phase coils 17 and the coil connection portions of the bus rings 25, 26, and 27 are electrically connected together, respectively, by a method, such as tungsten insert gas (TIG) welding, laser welding, resistance welding, soldering, or resistance brazing.

As shown in FIG. 2, the U-, V-, and W-phase terminal wires 17*b* of a neutral-side first set are led out from the respective three coils 17 of a corresponding first set, the U- and V-phase terminal wires 17*b* are connected to each other in a first wire connection portion 41, and the V- and W-phase terminal wires 17*b* are connected to each other in a second wire connection portion 42 in a different position from that of the first wire connection portion 41. The three terminal wires 17*b* of the U-, V-, and W-phase coils 17 configure a neutral point by being connected in a series via the first and second wire connection portions 41 and 42. A second set to a sixth set are also each provided with the first and second wire connection portions 41 and 42 in the same way.

That is, as shown in FIG. 2, a first set of neutral-side wire connection portions (formed of a first wire connection portion 41 shown by sign Nuv1 and a second wire connection portion shown by sing Nvw1) to a sixth set of neural-side wire connection portions (formed of a first wire connection portion 41 shown by sign Nuv6 and a second wire connection portion shown by sign Nvw6) are disposed in that order along the circumferential direction.

Figure 3:
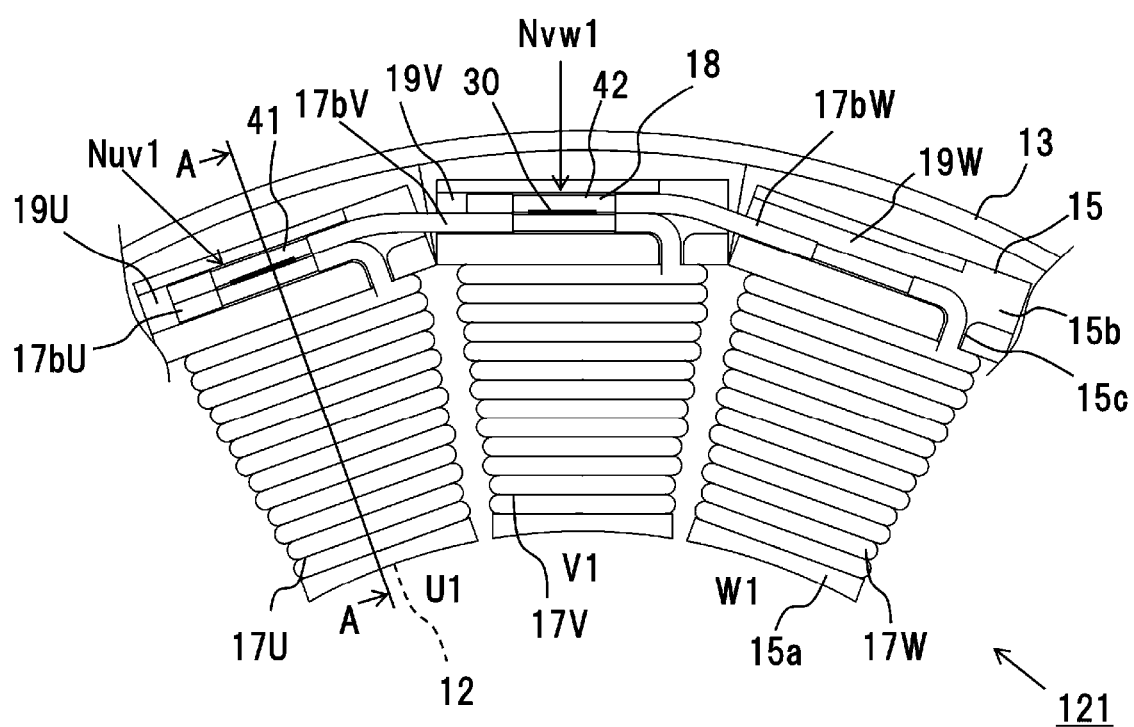
FIG. 3 is a main portion enlarged view of the neutral side of the stator of FIG. 2.

Then, as shown in FIG. 3, the groove portion 19 in which to house the terminal wire 17*b* is formed in the flange portion 15*b*, dug down along the circumferential direction and in the axial direction, and a radial groove portion 15*c* through which to insert the terminal wire 17*b* is formed in an insulating member (a partition plate) positioned between the groove portion 19 and the coil 17.

FIG. 3 is a main portion enlarged view of the neutral side of the stator 10 of FIG. 2 and is an enlarged view of, for example, a first split core portion 121 formed of three split core portions shown by signs U1, V1, and W1.

For example, the first wire connection portion 41 is positioned in the circumferential center of a groove portion 19U (the groove portion 19 corresponding to the U phase). Therefore, a terminal wire 17*b*U (the terminal wire 17*b* corresponding to the U phase) is led in to the groove portion 19U side, via the radial groove portion 15*c*, in a position circumferentially short of the central portion of the groove portion 19U (the position in which the terminal wire 17*b*U is bent).

When housing the terminal wire 17*b*U in the groove portion 19U, the neutral-side terminal wire 17*b*U of the U-phase coil 17 is once led out axially from the radially outer side of the coil winding portion 15*a*, is next bent at a right angle toward the flange portion 15*b* of the insulator 15, then led out radially outward, and fitted in the radial groove portion 15*c* of the flange portion 15*b*, and furthermore, the remaining terminal wire 17*b*U is bent along the circumferential direction of the groove portion 19U and fitted in the groove portion 19U.

In the same way, a neutral-side terminal wire 17*b*V of the V-phase coil 17 is led out from the coil winding portion 15*a* in the axial direction of the insulator 15, bent at a right angle, led out radially outward, and fitted in the radial groove portion 15*c* of the flange portion 15*b* of the insulator 15. Further, the terminal wire 17*b*V is bent and fitted in a groove portion 19V which is circumferentially opened and axially dug down in the same flange portion 15*b*, and the leading end portion of the terminal wire 17*b*V is extendedly fitted in the groove portion 19U of the adjacent split core 12 (shown by sign U1).

Two conductive wire portions formed of the leading end portions of the terminal wires 17*b*U and 17*b*V are housed in the groove portion 19U with both extending in parallel in contact with each other, and are connected together by brazing, or the like, in the circumferential center of the groove portion 19U, thus forming the first wire connection portion 41.

Also, in the second wire connection portion 42 too, in the same way, two conductive wire portions formed of the leading end portions of the terminal wire 17*b*V and a terminal wire 17*b*W are formed, extending in parallel in contact with each other, in the groove portion 19V and are connected together, thus forming the second wire connection portion 42. The first and second wire connection portions 41 and 42 are disposed in different circumferential positions and in the same radial position.

Herein, a state is such that no wire connection portion is provided, and only the terminal wire 17*b*W is housed, in a groove portion 19W.

It goes without saying that it is possible to provide two compacted wire connection portions (41 and 42) spaced from each other even when adopting a configuration such that the leading end portions of the terminal wires 17*b*W and 17*b*V are connected together in the groove portion 19W, and the leading end portions of the terminal wires 17*b*V and 17*b*U are connected together in the groove portion 19V, in order to reverse the connection of the three phases.

Also, uncoated portions 18 through each of which the conductive wire is exposed by removing an insulation coat which coats the conductive wire in order to be connected with a brazing material 30, or the like, are provided one each in an intermediate portion close to the portion led out from the coil 17V, and in a leading end portion close to the terminal portion, of the V-phase terminal wire 17*b*V disposed bent down to one side in the circumferential direction of the motor. Also, an uncoated portion 18 is provided in at least the leading end portion of the W-phase terminal wire 17*b*W. The U-phase terminal wire 17*b*U is not extended to the adjacent split core, thus itself being that much shorter than the V- and W-phase ones, has no portion equivalent to the intermediate portion, and has provided in the leading end portion thereof an uncoated portion 18.

Only the intermediate portion of the W-phase terminal wire 17*b*W is disposed in the groove portion 19W of a W-phase insulator 15. In the groove portion 19V of a V-phase insulator 15, the leading end portion of the W-phase terminal wire 17bW is disposed on the radially outer side of the motor, and the intermediate portion of the V-phase terminal wire 17bV is disposed on the radially inner side of the motor. In the groove portion 19U of a U-phase insulator 15, the leading end portion of the V-phase terminal wire 17bV is disposed on the radially outer side of the motor, and the leading end portion of the U-phase terminal wire 17bU is disposed on the radially inner side of the motor.

Then, the pair of W- and V-phase conductive wires and the pair of V- and U-phase conductive wires are disposed in the bottom portions of the groove portions 19U and 19V, respectively, with the conductive wires extended in the same direction and with the outer peripheral portions of the two conductive wires of each pair aligned in the radial direction of the motor so as to be adjacent to each other.

Therefore, the number of neutral points aligned in the radial direction can be reduced to two or one from heretofore known three, enabling a product to be downsized in the radial direction.

Figure 4:
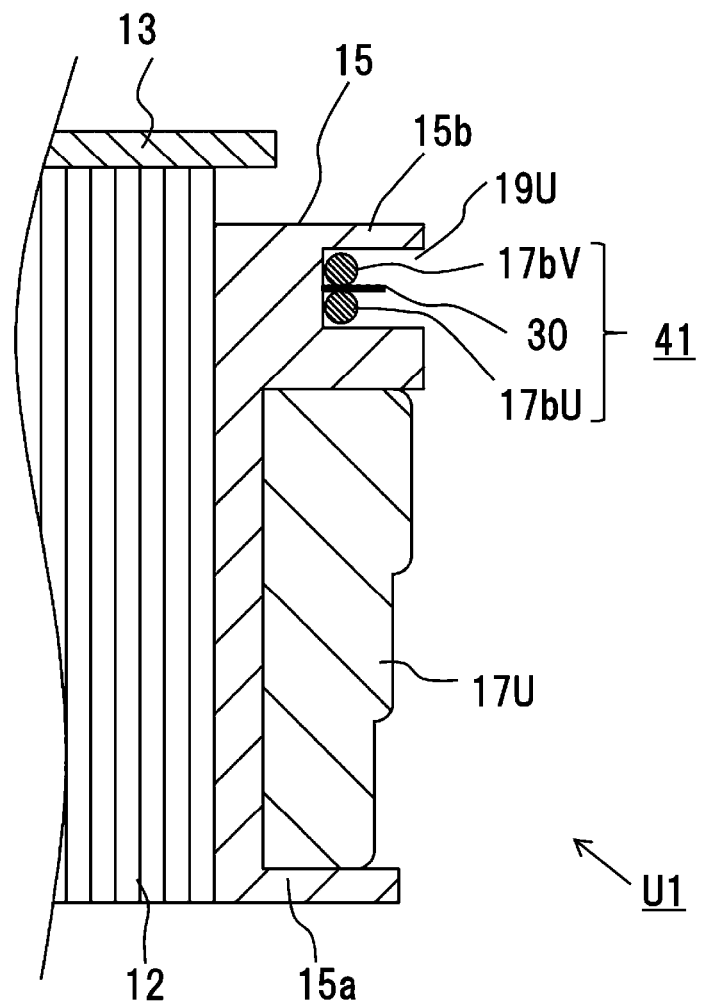
FIG. 4 is an A-A sectional view of FIG. 3.

FIG. 4 shows an A-A sectional view of FIG. 3. As shown in FIG. 4, the uncoated portions 18 of the U- and V-phase terminal wires 17bU and 17bV are disposed in the bottom portion of the groove portion 19U.

A plate-like brazing material 30 is sandwiched between the uncoated portions 18 of the U- and V-phase terminal wires 17bU and 17bV, and the U- and V-phase terminal wires 17bU and 17bV are electrically connected together by brazing, thus enabling formation of the first wire connection portion 41.

Also, a plate-like brazing material 30 is sandwiched between the uncoated portions 18 of the V- and W-phase terminal wires 17bV and 17bW, and the V- and W-phase terminal wires 17bV and 17bW are connected together by brazing, thus forming the second wire connection portion 42.

Figure 5:
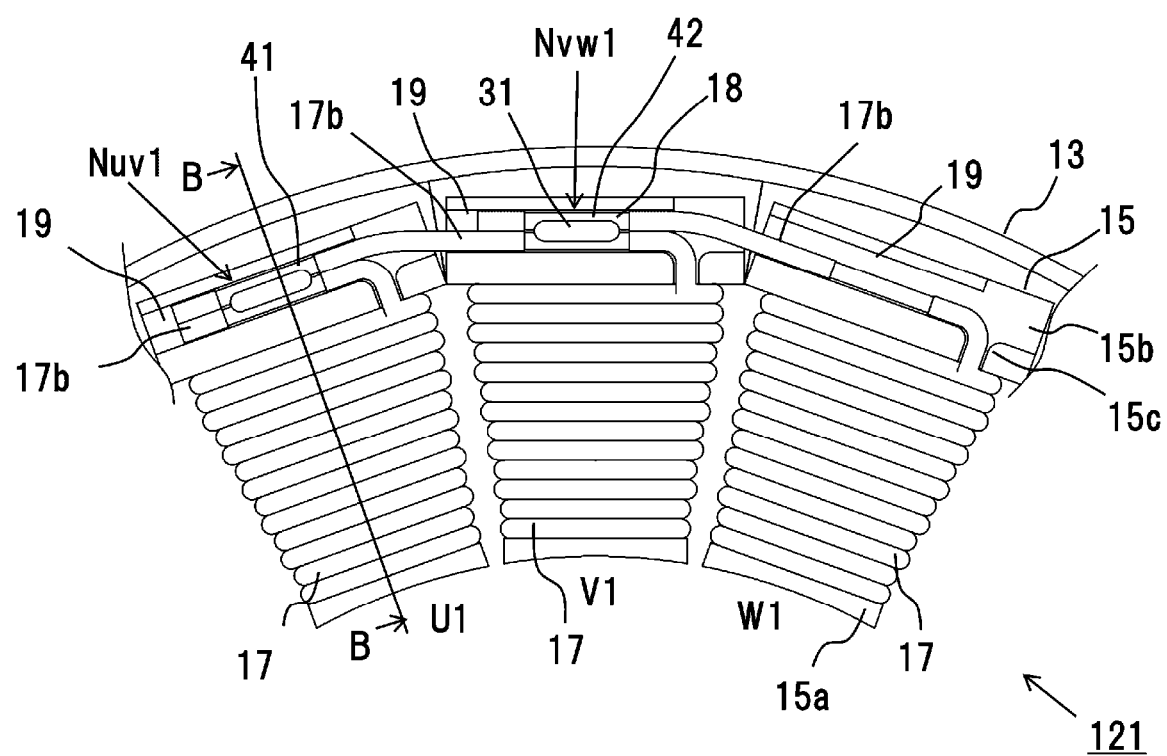
FIG. 5 is a main portion enlarged view of the neutral side of the stator of FIG. 2.
Figure 6:
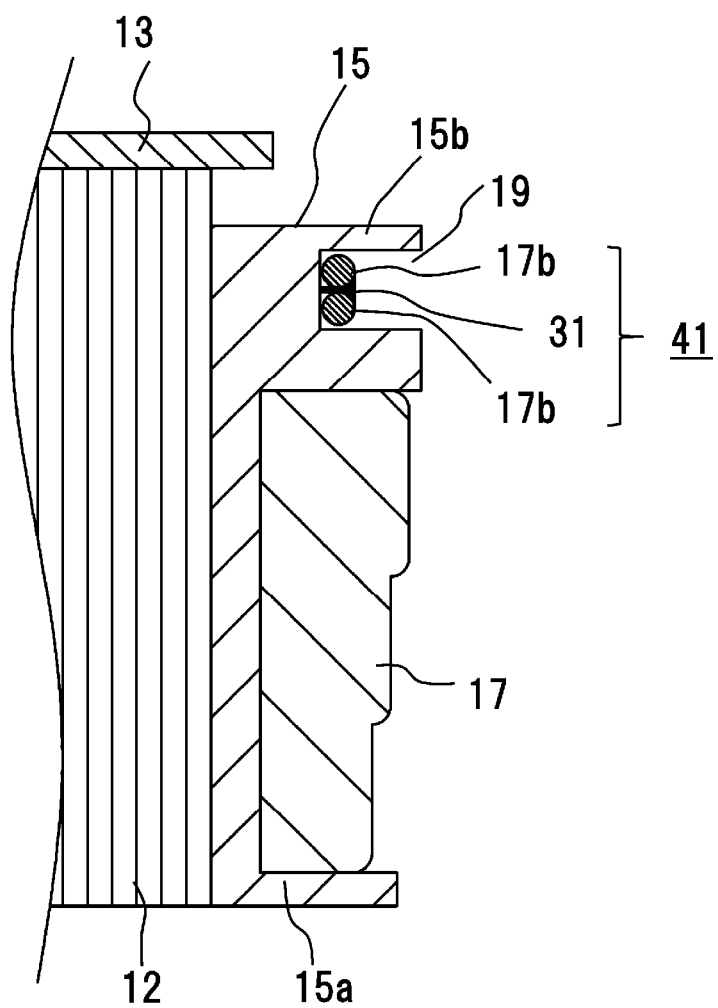
FIG. 6 is a B-B sectional view of FIG. 5.

The method of wire connection is not limited to a kind of connection method shown in FIGS. 3 and 4 whereby two conductive wire portions are brazed together with the brazing material 30 sandwiched between the conductive wire portions. For example, it is also possible to connect two conductive wire portions using a method of brazing the two conductive wire portions with a brazing paste or a cylindrical brazing material, which acts as a brazing material 31, put on the two conductive wire portions, as shown in FIG. 5 which is a main portion enlarged view of the neutral side of the stator 10 of FIG. 2 and as shown in FIG. 6 which is a B-B sectional view of FIG. 5.

In this way, the leading end portions of the terminal wires 17bU and 17bV are connected together in the first wire connection portion 41 (the position signed as Nuv1 on the stator 10 in FIG. 2), and the intermediate portion of the terminal wire 17bV and the terminal wire 17bW are connected together in the second wire connection portion 42 (the position signed as Nvw1) spaced from the first wire connection portion 41. Therefore, the number of conductive wires which are connected in the first or second wire connection portion 41 or 42 is two, and the wire connection portion can be radially downsized as compared with in a heretofore known configuration wherein three conductive wires are bundled in one wire connection portion. Therefore, it is possible to configure a finally obtained product into a more compact package.

Also, the terminal wires 17bU, 17bV, and 17bW are formed to be led out from the winding portions of the coils 17U, 17V, and 17W, respectively, to the radially outer side of the circumference (upward on the plane of FIG. 3) and be bent down along one circumferential direction (leftward on the plane of FIG. 3 and yet in a direction along the circular arc) and are each brazed after being bent down. Therefore, it is possible to reduce damage on the bent portions as compared with when a plurality of conductive wires are bent after being connected together by brazing.

In addition, as the positions in which the terminal wires 17bU, 17bV, and 17bW are bent are dispersed one from another, the terminal wires 17bU, 17bV, and 17bW are each bent before being joined and are housed in the groove portion 19U, 19V, and 19W.

Therefore, according to the configuration of the present application, the configuration is not such that the neutral point of a structure wherein a plurality of conductive wires are bundled in one wire connection portion is bent toward the radially inner side of the stator 10, as heretofore known, and so it is possible to keep a force applied to the bent portion small and thus possible to suppress crack generation in, or breaking of, the bent portion of the conductive wires.

Furthermore, according to the configuration of the first embodiment, the neutral point can be connected without using a connecting part, such as a bus bar, and so it is possible to reduce the number of parts of the motor.

Also, by bending down the neutral-side terminal wires 17b in the circumferential direction, the height of the axially disposed neutral-side terminal wires 17b can be suppressed to one wire's worth of height, and so it does not happen that the axial length of the motor increases.

Furthermore, as the number of terminal wires 17b disposed radially in the groove portion 19 can be suppressed to at most two, the radial size of the motor can be reduced compared with in the heretofore known configuration, and even when the configuration of the first embodiment is applied to a product with a narrow core back, it is possible to suppress the protrusion of a wire connection portion (a connecting portion) as a neutral point from the core back.

Also, by disposing the terminal wires 17b in the groove portion 19 of the insulator 15, it is possible to secure the insulation to the ground between the split core 12 and the terminal wires 17b, and by suppressing the amplitude of the terminal wires 17b, and of the first and second wire connection portions 41 and 42 as the neutral points, caused by vibration, it is possible to prevent breaking and disconnection of these conductive portions.

Also, as the uncoated portion 18 of each neutral-side terminal wire 17b is such that the insulation coat is removed from only a portion required to be connected, the number of portions from which the insulation coats are removed is limited to the minimum, thus reducing the time taken to remove the coats, enabling an improvement in productivity.

Second Embodiment

Figure 7:
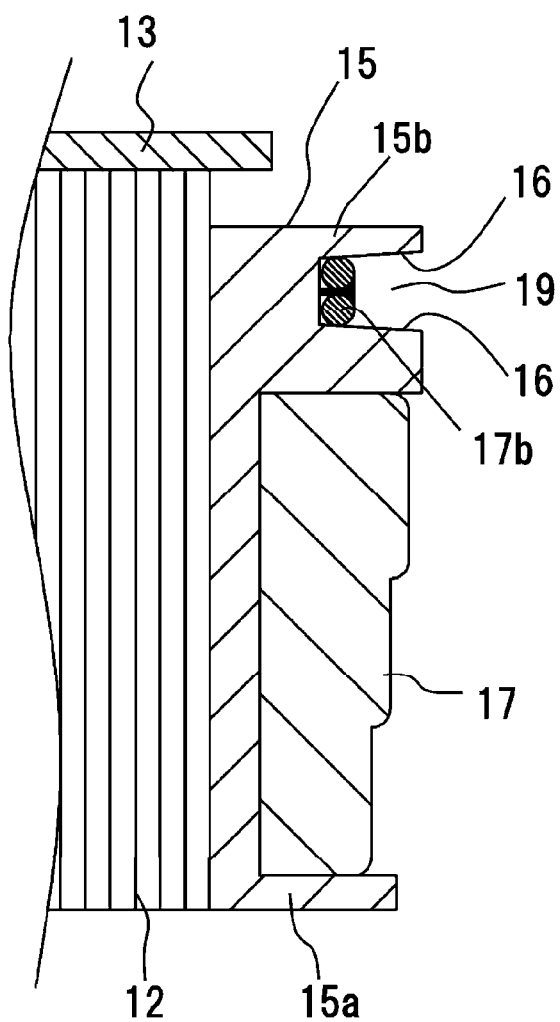
FIG. 7 is a main portion sectional view of the neutral side of a stator according to a second embodiment.

FIG. 7 is a main portion enlarged view of the neutral side showing a motor stator 10 according to a second embodiment and is a B-B sectional view of FIG. 5. In the heretofore described first embodiment, the groove portion 19 provided in the insulator 15, the side surface portions of which extend axially straight, is opened so as to have a constant opening width between the side surface portions and a predetermined depth along the axial direction, but in the second embodiment, the side surface portions of the groove portion 19 are formed as tapered surface portions 16 (inclined surface portions), the opening width between which decreases toward the bottom.

The formation of the tapered surface portion 16 enables two terminal wires 17b to be press fitted and fixed in the bottom portion along the tapered surface portions 16 of the groove portion 19. The two terminal wires 17b (there is also a case in which the brazing material 30 is interposed between the conductive wires) can easily be fixed in the bottom portion of the groove portion 19 by being press fitted in up to the bottom portion of the groove portion 19 along the tapered surface portions 16. The two terminal wires 17b are press fitted and fixed in the bottom portion of the groove portion 19, and thereby it is possible to suppress damage due to vibration, and thus possible to suppress breaking of the terminal wires 17b themselves or disconnection occurring in the wire connection portion in which the terminal wires 17 are connected together.

Third Embodiment

In the heretofore described first embodiment, an example is shown wherein the groove portion 19 of the insulator 15 is dug down in a constant width, and in the second embodiment, an example is shown wherein the side surfaces of the groove portion 19 are configured of tapered surface portions 16, the opening width between which is configured so as to decrease toward the bottom, but in a third embodiment, the groove portion 19 includes protrusion portions 33a which suppress uplift of two conductive wires held in the bottom portion of the groove portion 19.

Figure 8:
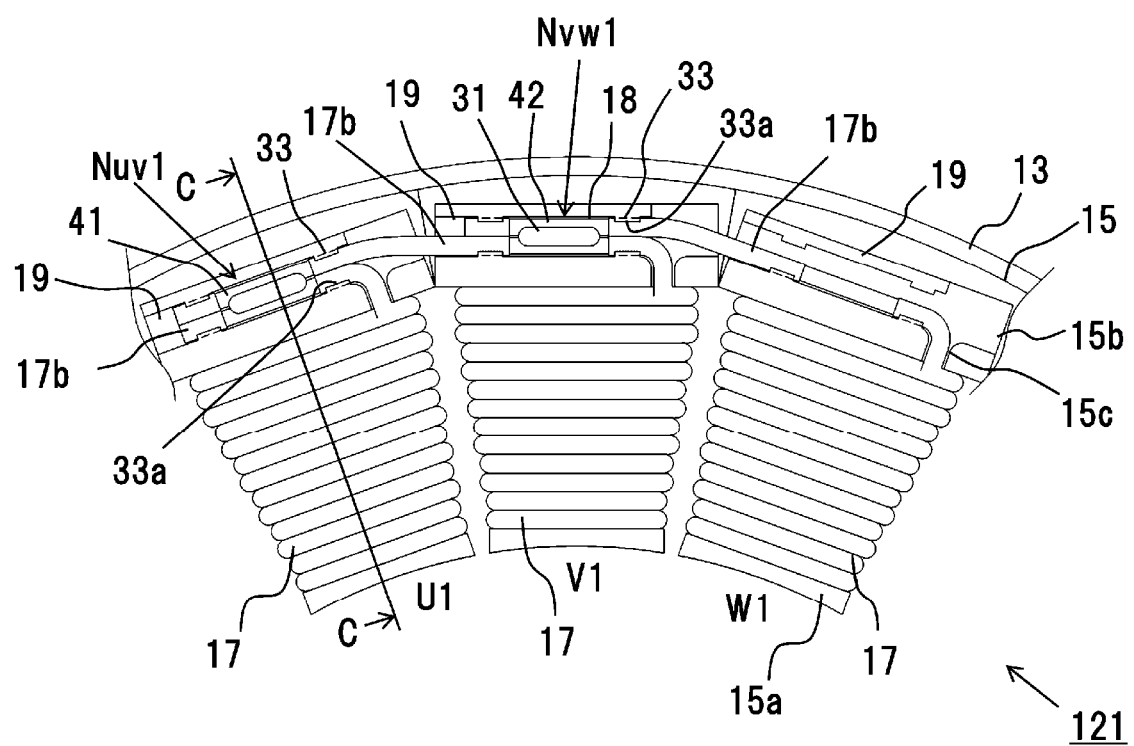
FIG. 8 is a main portion enlarged view of a front view of the neutral side of a stator according to a third embodiment.
Figure 9:
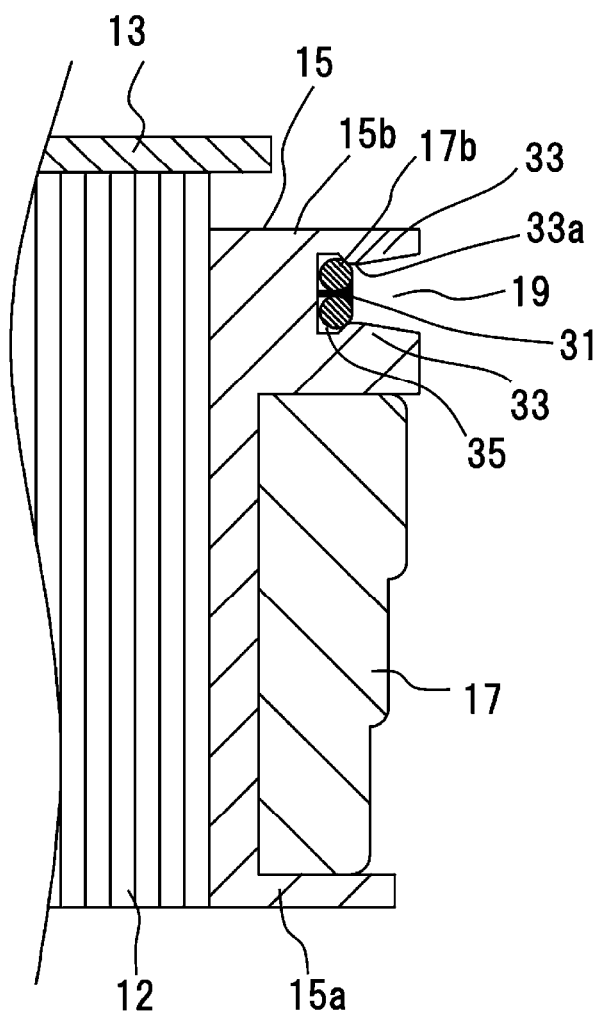
FIG. 9 is a sectional side view taken along the C-C line of FIG. 8.

FIG. 8 is a main portion enlarged view of the neutral side of a motor stator according to the third embodiment and is an enlarged view of a first split core portion 121 formed of three phase split cores 12. Also, FIG. 9 is a sectional side view taken along the C-C line of FIG. 8. As shown in FIG. 9, in the portion in which the protrusion portions 33a are formed, a terminal wire housing space 35 in which to house two terminal wires 17b is provided in the bottom portion of the groove portion 19, and the inclined surface portions 33 which form the side surface portions of the groove portion 19 which extend to the upper portions of the terminal wire housing space 35 are provided so that the opening width between the upper portions of the terminal wire housing space 35 (the lower portions of the inclined surface portions 33) are smaller than the opening width of the terminal wire housing space 35.

That is, the state is such that the protrusion portions 33a protruding to the inner side of the groove portion 19 so as to prevent the terminal wires 17b from coming out of the terminal wire housing space 35 are provided, protruding one from either side surface portion, one in each of the upper portions of the terminal wire housing space 35 (one in either position which is higher by one conductive wire's worth of distance from the bottom). The protrusion portions 33a provided on the groove portion 19 are configured so as to be able to restrain the terminal wires 17b housed in the terminal wire housing space 35 from moving in the axial direction of the motor and thus able to suppress disconnection in the first and second wire connection portions 41 and 42, and breaking of the terminal wires 17b, due to vibration.

Herein, as shown in FIG. 8, for example, the inclined surface portion 33 and the protrusion portion 33a are provided in each of the two circumferential end portions of the groove portion 19 which sandwich the first wire connection portion 41 therebetween, but the uncoated portion 18 to be brazed is not hidden behind by the protrusion portions 33a, thus not preventing a brazing operation.

Fourth Embodiment

Figure 10:
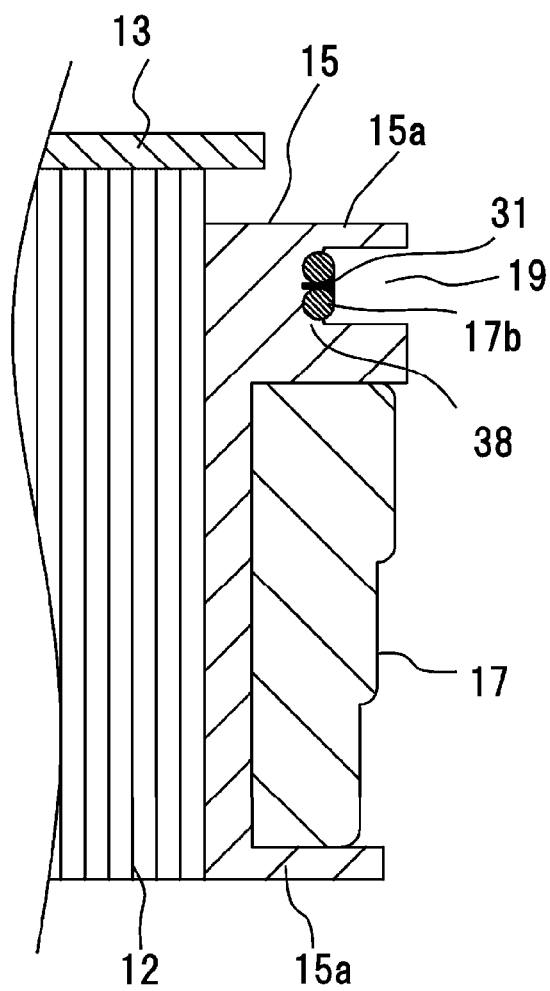
FIG. 10 is a main portion sectional view of the neutral side of a stator according to a fourth embodiment.

FIG. 10 is a main portion enlarged view of a motor stator 10 according to a fourth embodiment and is a diagram equivalent to the B-B sectional view of FIG. 5. In the heretofore described first to third embodiments, it is shown that the terminal wires 17b are housed or press fitted in the groove portion 19, but in the fourth embodiment, the feature is such that the insulator 15 configuring the groove portion 19 is melted by the terminal wires 17b being increased in temperature, and that the melted resin portion is converted to a bonding material 38 and used to fix the two terminal wires 17b in the bottom portion and the inner side portion of the groove portion 19.

By melting the resin of the insulator 15 on the inner wall of the groove portion 19 and using the melted resin as the bonding material 38, the terminal wires 17b are fixed in the groove portion 19, and thereby it is possible to fix the set of W- and V-phase terminal wires 17b and the set of V- and U-phase terminal wires 17b in the respective insulators 15 and thus possible to prevent disconnection in the first and second wire connection portions 41 and 42, and breaking of the terminal wires 17b themselves, due to vibration.

Various modifications and alterations of this invention will be apparent to those skilled in the art without departing from the scope and spirit of this invention, and it should be understood that this is not limited to the illustrative embodiments set forth herein.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A motor stator, comprising:
   a plurality of teeth disposed along a direction of a circumference centered on the axis of a motor;
   coils which are wound one around each of the teeth and to each of which to feed a current of one of a first, a second, or a third phase; and
   insulators, each of which insulates the tooth from the coil and holds the coil, wherein
   a first, a second, and a third coil corresponding to the first, second, and third phases, disposed along the circumferential direction, respectively, have a first, a second, and a third terminal wire on a neutral side which are led out from respective winding portions wound one around each of the teeth,
   the first and second terminal wires are connected together in a first wire connection portion, and the second and third terminal wires are connected together in a second wire connection portion spaced from the first wire connection portion, and
   the first, second, and third terminal wires are led out, respectively, from the winding portions of the first, second, and third coils through respective radial groove portions formed in the insulators at a position radially outward from the first, second, and third coils.

2. The motor stator according to claim 1, wherein
the first, second, and third terminal wires
are formed to be bent down along one direction in the circumferential direction.

3. The motor stator according to claim 1, wherein
two conductive wire portions formed of the first and second terminal wires or two conductive wire portions formed of the second and third terminal wires are formed extending in parallel while in contact with each other, respectively, in the first or second wire connection portion.

4. The motor stator according to claim 1, wherein
the insulators each have a groove portion, which is dug down in the axial direction, in a portion positioned on the radially outer side of each of the teeth, and the first and second terminal wires, the second and third terminal wires, or the third terminal wire is housed in the groove portion.

5. The motor stator according to claim 4, wherein
the first and second terminal wires centered on the first wire connection portion or the second and third terminal wires centered on the second wire connection portion are fitted in the bottom portion of the groove portion.

6. The motor stator according to claim 4, wherein
the groove portion includes inclined surface portions, the opening width between which decreases toward the direction of depth from the upper ends of the opening portion of the groove portion.

7. The motor stator according to claim 6, wherein
the groove portion has in the bottom portion thereof a terminal wire housing space which houses the first and second terminal wires or the second and third terminal wires, and the opening width between the lower portions of the inclined surface portions which extend to the upper portions of the terminal wire housing space is smaller than the opening width of the terminal wire housing space.

8. The motor stator according to claim 4, wherein
the first and second terminal wires or the second and third terminal wires are fixed in the bottom portion of the groove portion by a resin portion to which converts the bottom portion and inner side portions of the groove portion.

9. The motor stator according to claim 1, wherein
the first terminal wire and the leading end portion of the second terminal wire are connected together in the first wire connection portion, and the third terminal wire and the intermediate portion of the second terminal wire, which is in the intermediate position between the leading end portion of the second terminal wire and the winding portion, are connected together in the second wire connection portion.

10. The motor stator according to claim 1, wherein
insulation coats which coat the respective conductive wire portions of the first, second, and third terminal wires are removed in the first and second wire connection portions.

11. A method of manufacturing the motor stator according to claim 1, wherein
the first and second terminal wires or the second and third terminal wires are connected together by brazing in the first or second wire connection portion.

12. A method of manufacturing the motor stator according to claim 5, wherein
the first and second terminal wires centered on the first wire connection portion or the second and third terminal wires centered on the second wire connection portion are press fitted in the bottom portion of the groove portion.

* * * * *